April 12, 1966 R. F. HAWKINS 3,245,601
HEAT SEALABLE PAPERBOARD BLANKS
Filed May 13, 1964 2 Sheets-Sheet 1
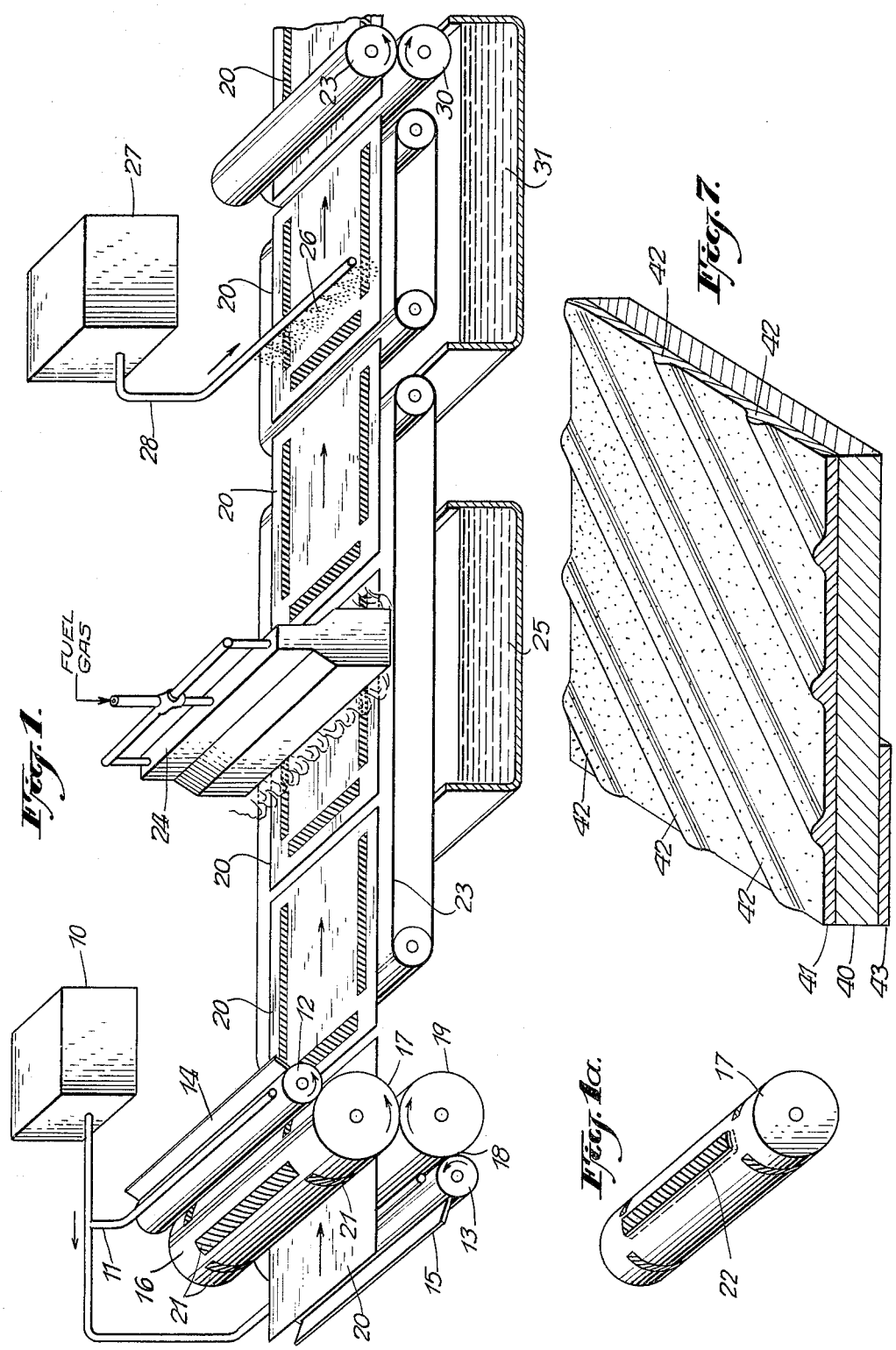

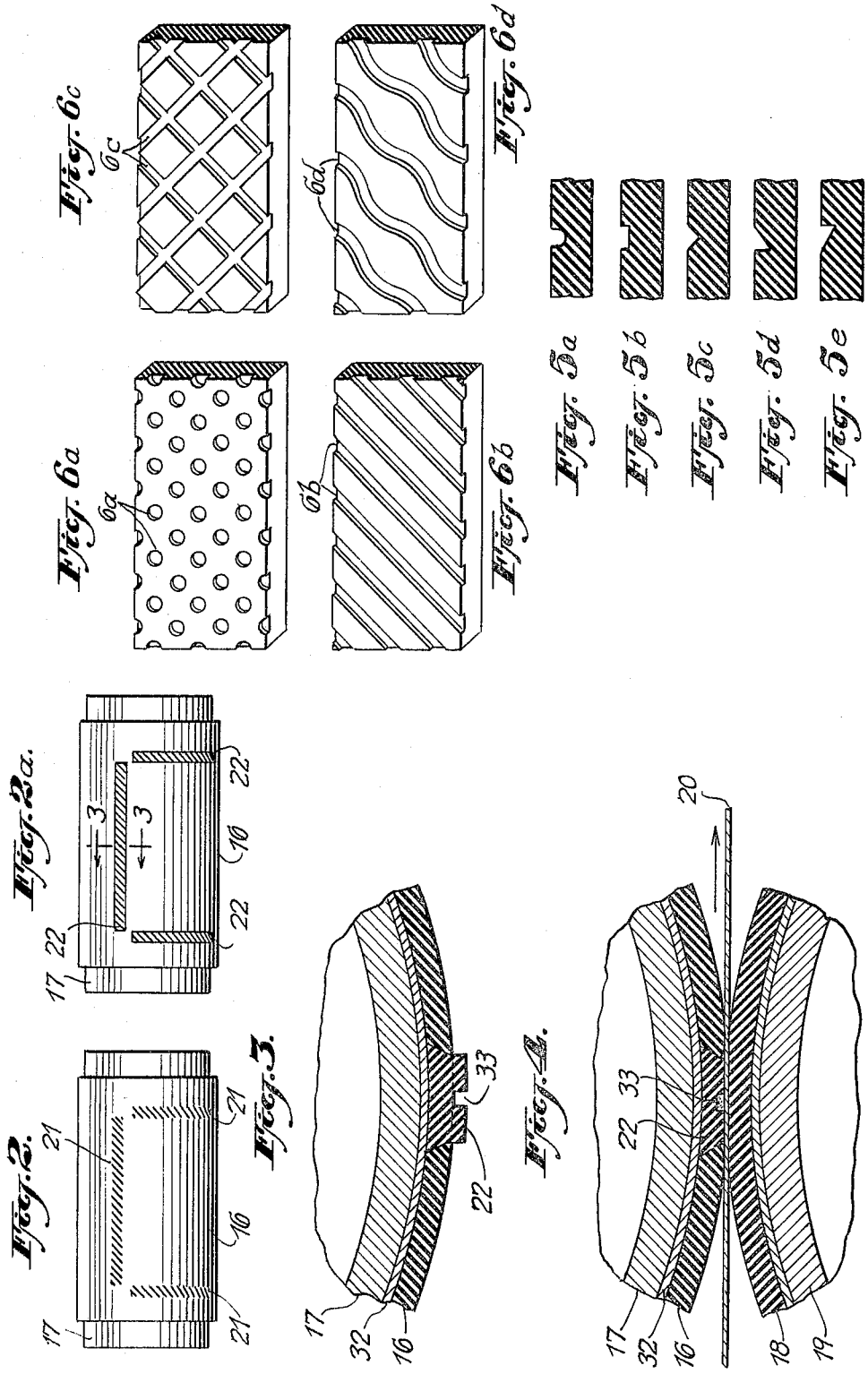

United States Patent Office 3,245,601
Patented Apr. 12, 1966

3,245,601
HEAT SEALABLE PAPERBOARD BLANKS
Robert F. Hawkins, Dallas, Tex., assignor to St. Regis Paper Company, New York, N.Y., a corporation of New York
Filed May 13, 1964, Ser. No. 366,970
8 Claims. (Cl. 229—3.1)

This is a continuation-in-part of application Serial No. 268,787, filed March 28, 1963.

This invention relates to flexible material, preferably paperboard, which is adapted to be folded and sealed to itself through the intermediate of a heat sealable composition to form a container, carton or the like. More specifically, the invention has to do with a coated heat sealable paperboard container blank and to a method and apparatus of making same.

Paperboard stock with which this invention is primarily concerned, but to which the invention is not necessarily limited, includes solid board of a caliper, i.e. thickness, ranging from about 8 to about 30 points (1 point=0.001 inch or mil). Such paperboard stock is employed, for example, in cartons or containers for various goods such as food products like butter, margarine, ice cream, bacon, etc., and normally is a solid bleached sulfate board of a caliper ranging between about 12 and 16 points. Paperboard stock of this type is usually coated with hydrophobic compositions, such as wax, on one or both inner and outer surfaces to reduce or effectively eliminate moisture vapor transmission. In the interest of conservation of material, the paperboard is usually cut, trimmed, and scored to the desired configuration before any coating material is deposited thereon. It has been a practice in the past first to apply to a paperboard container blank an overall coating of hydrophobic or wax composition impermeable to water and moisture vapor (hereinafter sometimes referred to simply as "moisture barrier" composition) and then to apply a sealing composition at one or more overlapping portions of said blank so that said paperboard blank can be closed or joined at such places. Such sealing compositions have taken the form of a cold liquid adhesive or a heat sealing or thermoplastic material.

In the cold method, a liquid glue is spot applied to one or both overlapping laps or portions of the moisture barrier composition coated blank at the filling or packaging machine, and thereafter, heat is applied to the outer surface of the container in the glue areas. This heat melts the moisture barrier coating in the areas where the glue has been applied and allows the coating to flow into the paperboard thus presenting a cellulose fiber surface to which the glue may readily adhere. This cold method of course requires application of the glue in the plant where the containers are shaped and filled.

In order to simplify sealing for the packager, use has been made of heat sealable adhesives or bonding material, which are spot applied to the blank after it is coated with wax or other hydrophobic composition. Sealing is then effected by application of heat and pressure to the joint or closure areas of the filled container. Pressure is required with both cold and heat sealable adhesives to overcome the tendency of the scored yet relatively stiff paperboard to snap back, and to maintain the glue in contact with both surfaces to be joined for the required setting time.

Any spot application of adhesive or bonding composition, whether it be a cold glue or a heat sealable composition, is difficult because of the underlying wax coating which also tends to interfere with a uniformly satisfactory seal. Also, special and additional apparatus is required to apply the adhesive or bonding composition. Furthermore, application of the adhesive or bonding composition only to selected areas of the blank requires precise timing, and where a timed operation is necessary, a loss from maximum efficiency usually results.

It is advantageous if the moisture barrier coating composition can also be used as the heat sealable material to cause the overlapping surfaces of the folded blank to adhere to each other when the container is formed. In this way a two stage operation could be accomplished in one step and one composition be used instead of two. Economies and efficiencies in operation are thus obtained. Heretofore, difficulties have been encountered in this regard. In the past, when a layer of coating composition sufficiently heavy to serve also as a heat sealable material has been applied in a generally smooth overall pattern, the coating composition had a tendency to strike through the paperboard stock unless the coating composition was extremely viscous. On the other hand, increasing the viscosity of the coating composition to prevent "strike-through" presented problems in applying the coating composition.

In my copending application Serial No. 268,787, filed March 28, 1963, of which this application is a continuation-in-part, I have described a paperboard container blank which has been coated with a coating composition which is not only impermeable to water and moisture vapor, but also is heat sealable. The coating composition is applied in such a fashion that, at least at those portions of the paperboard blank which are to be sealed, greater coating weights of the coating composition are deposited. The coated surface of the paperboard blank, thus, is generally smooth except where the heavier coating weights have been applied, and, at such areas, protuberances or projections, upraised or elevated areas appear corresponding to those areas in which greater coating weights have been deposited. The non-uniform or uneven surface characteristics of the coating composition layer upon the paperboard blank serves a number of useful purposes in addition to those already discussed. The presence of these protuberances, projections, upraised or elevated areas (hereinafter sometimes referred to simply as "projections") improve the blocking characteristics of the coated paperboard blanks by minimizing the area of contact between successive layers of such blanks when stacked one upon the other for extended periods under conditions of high ambient temperature and humidity. By properly selecting the coating composition and applying it to the paperboard blank in the fashion of my invention, blocking can be eliminated. Also, the projections improve the heat sealing operation by minimizing the contact area when overlapping portions of the paperboard blank are brought together for sealing, and, accordingly, the unit pressure is increased. This increased pressure facilitates lamination and sealing. Furthermore, the projections: (a) reduce heat sealing time by hastening "set-up," (b) somewhat reduce the temperature required for heat sealing, and (c) produce a more uniform and effective seal. All of the foregoing is accomplished although much less overall coating weight is employed than generally used previously.

The method described in my aforesaid copending application for obtaining such coated paperboard container blanks involves coating the surface of the paperboard blank with a composition which is both a moisture barrier coating and heat sealable by means of a drawing operation performed, for example, with a pile fabric covered heated roll.

The paperboard blank of this invention is of the type generically disclosed in my prior aforesaid application in which the paperboard stock is coated with a composition, which is both a moisture barrier and heat sealable, in such a manner that greater coating weights are deposited in various localized areas, including at least those areas at which a heat sealing bond will be produced, to obtain a pattern of projections at those localized areas. More specifically, the paperboard blanks of this invention have projections of the barrier and heat sealing composition distributed over its surface in a predetermined pattern, i.e., the configuration of the pattern is selected by design and not a random result independent of the operator. The pattern of these projections may take a variety of forms and shapes such as dots, tubercles, lines, rods, and mesh, and may be straight or curved, uniform or non-uniform, or of any combination thereof. The pattern may be parallel to, or at an angle from, the edges of the paperboard blank.

While it is possible to coat the paperboard blank with the coating composition on only one surface, it is generally preferred for reasons of maximum moisture-vapor-transmission resistance to coat the blank on both major surfaces. Where this is done, the predetermined pattern of projections can be on one or both sides of the blank. It has further been found desirable in some cases to form predetermined projections on the surfaces of the blank which are to be contiguous when they are overlapped and sealed together. It is also within the contemplation of this invention, to coat only selected areas of the paperboard blank and leave other areas of the blank uncoated. This latter "coated and uncoated" method finds application in packages designed to contain and display certain foods such as sliced bacon through transparent windows made of plastic, e.g. cellophane. The transparent plastic is bonded to the paperboard and it is desirable that there be no coating material at the point of bonding.

Briefly, the paperboard blank of this invention having a raised predetermined pattern portion at least at the locations where sealing is to take place is made by a method which comprises applying the heat sealable and moisture barrier coating composition to a paperboard blank by a transfer roll having a rubber-like surface and a plurality of recesses therein. The transfer roll will deposit upon the paperboard blank greater amounts of the coating composition at the sites where the recessed areas of the transfer roll contact the blank. When the coating composition is cooled to its congealing temperature, projections or raised areas are formed on the blank having the mirror-image shape of the recessed area of the transfer roll.

It is desirable that the fluid coating composition which has been deposited on the paper board blanks be congealed as soon as conveniently possible after its deposition on the paperboard blank. This is accomplished by cooling the blank to a temperature below the congealing point of the particular coating composition being used. Such cooling is readily effected by a number of methods known in the art, as by a cool gas or liquid.

The transfer roll useful in the practice of this invention in applying the coating composition to the paperboard blank is unique in its design and construction. In its preferred form, it is usually cylindrical in shape and comprises a solid, the surface of which is covered by a rubber-like material or pad. The pad may be readily applied to the core of the roll by cementing it to a metallic, preferably brass, stock first. The pad covering may be any rubber-like or elastomeric material that is compatible with the coating composition, capable of compression and regaining its original shape and able to withstand temperatures of about 220° F. which are necessary to keep the coating composition sufficiently fluid for application. A butadiene-acrylonitrile interpolymer (Buna-N) has been found to be particularly satisfactory. The rubber-like pad covering may vary in hardness from about 30 to 55 Shore durometer units. Recesses of a selected shape are provided in the rubber-like pad covering to obtain the shape of the projections on the coated paperboard container blank desired.

In a preferred embodiment of this invention, the recessed areas are provided in another and different rubber-like material (hereinafter called "insert") which is resistant to the coating temperatures of about 220° F., compatible with the coating composition, and has a hardness preferably in the range of from about 40–45 Durometer units. The insert is then affixed to the transfer roll to become an integral part of the transfer roll in the manner, for example, more fully described hereinafter. The use of this insert is advantageous in that it is possible to use less pressure to force the coating composition from the applicator roll into the recesses of the transfer roll and to force the coating composition from the recesses and onto the paperboard container blanks. Moreover, less coating composition is required to obtain results which are equivalent, or even superior, to those obtained when the recesses are made directly in the rubber pad covering the core of the transfer roll.

The relative compressibilities of the rubber insert and the rubber pad covering of the transfer roll may be illustrated as follows. In the example given, the rubber insert has a Shore durometer hardness of about 45 and the rubber pad has a Shore durometer hardness of 55.

INSERT

| Pounds Force | Pressure, lb./inch $^2$ | Thickness (in.) |
| --- | --- | --- |
| 0 | 0 | 8/32 |
| 150 | 60 | 7/32 |
| 225 | 90 | 9/32 |
| 300 | 120 | 5/32 |
| 375 | 150 | 9/64 |
| 450 | 180 | 9/64 |
| 525 | 210 | 4/32 |
| 600 | 240 | 7/64 |
| 675 | 270 | 7/64 (43.7% of original thickness) |

PAD

| Pounds Force | Pressure, lb./inch $^2$ | Thickness (in.) |
| --- | --- | --- |
| 0 | 0 | 3/16 |
| 150 | 60 | 3/16 |
| 300 | 120 | 3/16 |
| 375 | 150 | 11/64 |
| 450 | 180 | 5/32 |
| 525 | 210 | 5/32 |
| 600 | 240 | 5/32 (83.3% of original thickness) |

With the foregoing parameters, the rubber insert has the same thickness as the rubber pad at 225 lbs. force. In this instance, when the force exerted is 450 lbs., then both the pad and the insert reach their minimum dimension.

The projections produced in accordance with this invention, usually range in height from about 0.4 to 2 mils above the continuous coated surface of the paperboard depending upon the weight or thickness of coating on the surface. As a general proposition, the lighter the coating composition, the lower the height of the projections. In a particularly preferred embodiment employing 10–16 point board stock, the projection height is between about 0.7 and 1.2 mils with coating composition weights between about 6 and 8.5 pounds per ream.

The weight of the coating composition on the outer surface of the blank may vary with 8–30 point board stock from about one-half to eight pounds per ream (3,000 square feet). On the inner surface the coating composition will range between one and twelve pounds per ream. As a practical matter, only with the very heaviest board or for particular purposes would the coating composition on the outer surface exceed about five pounds per ream. On the inner side the practical upper limit with boards of intermediate caliper is about eight to nine pounds per ream. It is desirable, and in accordance with the present invention quite possible, to maintain a given weight on the inner surface while varying the weight on the outer surface depending upon the caliper of the paperboard. Since the inner surface is the primary source of the heat sealable composition, substantially more material is required in this area for heavier board, by reason of its tendency to snap or spring back during sealing. As a practical matter, it can be said that the coating on the inner side of the blank will range from about 1 to about 3 times the weight of said coating composition on the outer surface. Preferably, the ratio ranges from about 1:1.5 to 1:2.5.

Transfer of the coating composition to the paperboard container blanks depends upon a variety of factors. Among these factors are pressures exerted by the transfer rolls, and the temperature of the operation in the coating composition bath, on the applicator and transfer rolls, and at the point of contact between the transfer roll and the paperboard blank. One of the more important factors is the viscosity of the moisture barrier and heat sealing coating composition. In general, it has been found that for uniformity of application, for consistency of product, and to obtain projections of sufficient height to achieve the purposes of this invention, it is usually necessary that the viscosity of the coating composition at 220° F. be at least 40 centipoises.

If the viscosity is below 40 centipoises at 220° F., the projections may tend to level into the surrounding surface layer and the strength of the heat sealed joint would be deleteriously affected. Also, at viscosities below about 40 centipoises at 220° F., it becomes increasingly more difficult to control the coating weights applied. On the other hand, the viscosity of the coating composition at 220° F. should be below 400 centipoises. At higher viscosities it becomes too difficult to apply the composition to the transfer roll and to satisfactorily meter the composition. Other production problems are encountered in clean-up and clogging of various apparatus. Preferably, the viscosity should not exceed about 150–200 cps. at 220° F., and is most practicably about 50–100 cps.

Suitable moisture barrier and heat sealable coating compositions must exhibit good seal strength and should also be capable of producing a high gloss on the surface. A number of coating compositions are available which fulfill these requirements when applied to paper sheet stock, i.e., paper of a caliper below about 8 points. However, it does not follow that a coating which will produce a suitable seal with paper will perform satisfactorily in this and other respects with paperboard stock. For paperboard applications the moisture barrier and heat sealing composition must exhibit at least the following properties: fast set-up time, that is the time required for the composition to cool sufficiently to develop enough tensile strength in the bond at the overlap joint to resist the spring back of the paperboard stock, which is not encountered with paper because of its comparatively slight thickness; high set-up temperature, which is the temperature at which the coating develops enough tensile strength to resist spring back; good blocking resistance; low slip resistance to avoid drag in conventional package filling and closing equipment, and the coating must be of a sufficiently low viscosity so that the container blanks may be accurately coated at economical production speeds on existing waxing equipment.

An example of a preferred blend for use in the practice of this invention is:

14–20% ethylene-vinyl acetate; M.I.=125–175; vinyl acetate 27–29%
10–20% Microwax 160–180° F. M.P.
1–5% polyethylene (M.W. between 2000–7000)
75–52% of a paraffin containing between 64–72% n-paraffin.

For operations where open time on the coating is required, the addition of 10% of a terpene resin with the following properties is recommended:

Molecular weight _____ 580–770
Specific gravity _____ 0.995
Melting point, capillary ° C. _____ 65° C.–81° C.
Softening point (ball & ring), ° C. ____ 85–100° C.
Saponification No. _____ 0
Acid No. _____ 0

Such a terpene resin will be found to increase the open time of the wax-containing coating composition about 3 to 4 times.

A further description, enumeration, and illustration of suitable moisture barrier and heat sealing compositions appears in my copending United States patent application Serial No. 268,787, filed March 28, 1963. Generally, the coating compositions referred to in said copending application as suitable there are likewise satisfactory for use in this invention.

I have discovered that an intermediate cut petroleum paraffin wax blend can be modified to produce a composition of the correct viscosity for overall application to paperboard container stock. My novel composition is eminently satisfactory as respects each of the eight requirements set forth above. More particularly, it consists essentially of about 5–20% by weight of a copolymer of ethylene and vinyl acetate or of ethylene and methyl or ethyl acrylate, with an acetate or acrylate content ranging from about 20 to 35% by weight of the copolymer; about 10 to 20% of a microcrystalline petroleum wax having a melting point range of about 160–180° F.; about 1–5% polyethylene of a molecular weight in the range 1500–7000, and the balance, ranging from about 55 to 85% by weight, an intermediate paraffin wax containing a major portion of normal paraffins. The viscosity of the blend ranges from about 40 to 200 cps. at 220° F., and the congealing point range is about 150 to 170° F.

The paraffin wax component is preferably a fairly wide intermediate cut wax, which has slightly more flexibility and slightly higher viscosity than the narrower and higher paraffin wax cuts. The correct paraffin wax is essential to a good seal and good gloss on the outer surface of the blank. This wax contains between about 60 and 75% by weight of straight chain or normal paraffins, and the balance branch chain paraffins, monocyclic, polycyclic and aromatic constituents. Branch chain paraffins and monocyclic compounds constitute the major portion of the non-straight chain compounds. A preferred paraffin wax is one which contains about 66% N-paraffins, 20% branch chain, 10% monocyclic, 3% polycyclic and about 1% aromatics. Within the above specified range of 60–75%, I prefer those containing about 64–72% by weight N-paraffins. If this wax contains above about 75% normal paraffins the coating has poor blocking resistance and poor seal strength.

The microcrystalline wax component is a comparatively hard petroleum wax with a melting point in the range 160–180° F. This component may of course be made up of several waxes, some toward the high end end some even below the lower limit, but the mixture should melt in the range 160–180° F. The microcrystalline wax functions with the paraffin to improve the laminating strength of the heat seal. It affects the growth and crystal structure of the paraffin wax reducing or interrupting the normal paraffin plate crystals and so improves the gloss of the paraffin component. Microcrystalline waxes alone do not have particularly good blocking resistance, but with the paraffin this is improved and the setting temperature and the viscosity of the paraffin are increased.

A preferred copolymer is ethylene-vinyl acetate with a vinyl acetate content of about 27–29% by weight. A typical material of this type is Elvax 220. However, ethylene-vinyl acetate copolymers ranging from as low as about 20 to as high as about 35% by weight vinyl acetate may be employed. Also, the copolymer resin may be ethylene-methyl acrylate or ethylene-ethyl acrylate, with an acrylate content of about 20 to 35% by weight of the resin, but preferably about 25–30% by weight.

The copolymer functions in the wax mixture to improve the gloss, and to improve the seal by reason of its comparative tackiness, and to raise the viscosity of the composition thus preventing undue penetration of the paperboard stock by the hot coating. The copolymer also reduces the set-up time of the wax mixture and raises the melting point of the blend. It further serves to increase the tensile strength of the finished coating and improves its flexibility.

Finally, the polyethylene component has a molecular weight ranging from about 1500 to 7000. A preferred polymer has a molecular weight of around 2000, a melting point of about 220–226° F., and a viscosity of 180 cps. at 140° C. The polyethylene improves the gloss of the composition and the gloss stability of the coating. It also imparts hardness to the coating and improves its blocking resistance.

The invention may be more fully understood by reference to the accompanying drawings and the following more detailed description, illustrating by way of example, several preferred embodiments of the invention. It should be understood that it is not intended to limit the invention by this illustrative material.

In the accompanying drawings:

FIG. 1 is a perspective view of apparatus suitable for producing the coated paperboard container blanks of this invention;

FIG. 1a is a perspective view of a transfer roll suitable for coating paperboard container blanks in accordance with this invention;

FIG. 2 is a face view of the transfer roll shown as 17 in FIG. 1 and adaped to prepare the paperboard container blanks of this invention;

FIG. 2a is a face view of the transfer roll of FIG. 1a;

FIG. 3 is a fragmentary sectional view taken through the insert shown in FIG. 2a at line 3—3;

FIG. 4 is a fragmentary sectional view illustrating the action of the rubber mat and insert during application of the coating composition to the paperboard container blank;

FIG. 5a, FIG. 5b, FIG. 5c, FIG. 5d, and FIG. 5e show several fragmentary sectional views of a number of different variations of the types and kinds of recesses which may be used in the transfer roll;

FIG. 6a, FIG. 6b, FIG. 6c, and FIG. 6d show several fragmentary perspective views of several types or kinds of recesses which may be used in the transfer roll, the mirror image of which will appear as projections on the surface of the coated paperboard container blanks of this invention; and FIG. 7 is an enlarged fragmentary perspective partial sectional view of a portion of the heat sealable area on the paperboard container blanks of this invention.

The practice of the process of this invention may be more readily understood by reference to FIGURE 1 which is a simplified representation of one embodiment of the process. In accordance with the present invention, the heat sealable moisture barrier composition is heated and kept in a molten condition in tank 10 from which it is passed through a feed system 11 and applied to the surfaces of applicator rolls 12 and 13. Temperatures above 200° F. and in the range of 210°–250° F. are maintained to keep the composition sufficiently fluid. If it is desired only to coat one surface of the paperboard then either roll 12 or 13 may be omitted. The composition is distributed evenly on rolls 12 and 13 by the use, respectively, of doctor blades 14 and 15. The composition is transferred from applicator 12 to rubber pad 16 on transfer roll 17 and from applicator roll 13 to rubber pad 18 on transfer roll 19. It is helpful to maintain sufficient force between applicator roll 12 and pad 16 and between roll 13 and pad 18 to compress the pads and thereby aid the transfer of composition from the applicator roll to the pad.

The blanks 20 are fed into the bite between pads 16 and 18 to transfer the wax from these rolls to the surface of the blank. Here again, transfer of the wax-bearing composition from the pads 16 and 18 to the blanks 20 is enhanced if sufficient pressure is exerted between rolls 17 and 19 so as to compress the pad. In the embodiment illustrated in FIGURE 1, applicator pad 16 is recessed in areas 21. FIGURE 1a shows a preferred embodiment of this invention. In this instance, a recessed rubber insert 22 is used in pad 16. Recesses in, or inserts for, pad 18 can, of course, also be used, but these are not shown in FIGURE 1.

Since the moisture barrier and heat sealing composition must be kept above its congealing temperature until it is deposited on blank 20, it is desirable that some provision be made for heating pads 16 and 18 and insert 22. While such means have been omitted from FIGURE 1 for purposes of simplicity, electrical resistance heaters, such as "Calrod" units, have been satisfactorily used for this purpose. Radiation from other sources such as steam pipes or infrared lamps may also be used, or transfer rolls 17 and 19 may be heated.

Where a high luster surface is desired on the coated blanks, they are then moved from the coating rolls via conveyor belt 23 and passed under gas burner 24. Water bath 25 is positioned beneath the gas burner to absorb the heat. Here again, means other than a gas burner may be used to produce a high heat flux impinging on the blanks 20. If a high luster finish is not desired, this heating step may be omitted.

It is next preferred rapidly to chill or otherwise cool the moisture barrier and heat sealing composition to a temperature below its congealing point. In the embodiment shown in FIGURE 1, this is accomplished by passing the blanks 20 through water curtain 26 which is supplied with chilled water from tank 27 by means of distribution system 28. The blank may be cooled by other methods, such as passing them into a water bath or passing a chilled gas, for example, air, over the blanks.

In the embodiment illustrated in FIGURE 1, blanks 20 are next passed between squeeze rolls 29 and 30 to remove the excess water. Tank 31 is provided to intercept the run-off from water curtain 26 and the water removed from the blanks by squeeze rolls 29 and 30. If desired, the cooling may be provided by a series of water curtains or by a water curtain followed by a succession of squeeze rolls which are cooled by spraying them with chilled water. A water temperature which has been successfully used in the practice of this invention is 40° F., although any temperature which will reduce the blank to a temperature below the congealing point of the moisture barrier and heat sealing composition is suitable.

In order that the above-described embodiment of this invention may be more clearly appreciated, a face view of transfer roll 17 is shown in FIGURE 2. The areas of recess 21 in pad 16 can be readily seen in this view. FIGURE 2a is a similar view of the roll 17 as shown in FIGURE 1a which shows recessed insert 22.

FIGURE 3 illustrates a method of affixing insert 22 to transfer pad 16 which has been found satisfactory in the practice of this process. As can readily be appreciated from FIGURE 3, the insert 22 is wider at the base than at the point where it is in the plane of the top of pad 16, so that it is keyed into pad 16 to prevent it from falling out or working loose during use. The combination of pad 16 and insert 22 as shown in FIGURE 3 is cemented to a thin piece of metal stock 32, such as brass, so that the pad and insert may be readily affixed to the roll 17. With this method of construction the applicator pad-insert assembly can be quickly removed from and replaced on the roll 17 so that the machine can be readily adapted to produce a variety of patterned coatings on paperboard blanks. FIGURE 3 also shows in cross section a diagonal slot 33 which is recessed in the insert.

FIGURE 4 illustrates how pads 16 and 18 and insert 22 are compressed as they contact blank 20. It is this compression which forces a coating of moisture barrier and heat sealing composition onto the surface of the blank and which also forces an additional quantity of such coating composition from slot 33 to produce a projection on the surface of the coated blank. For simplicity of illustration, the coating composition is not shown in FIGURE 4.

The cross-section of the recess may be varied, for example, as shown in FIGURE 5. FIGURE 5a, the first embodiment, shows a curvilinear (in this case, semi-circular) cross section, while FIGURES 5b, c, d and e show rectilinear cross sections for the recess. FIGURE 5b illustrates a rectangular recess while FIGURES 5c, d and e illustrate various triangular recesses which may be used in the practice of this invention.

Th form of the recess in either the rubber insert or the rubber pad may be widely varied to suit the needs of a particular container. The recess may be either semi-circular in cross-section to produce dot-like or tubercle projections, shown in FIGURE 6a, or they may be channels in cross-section to produce the projection shapes as shown in FIGURES 6b, c and d. FIGURE 6b shows one of the easiest configurations to produce, a number of straight parallel rods. FIGURE 6c shows a cross hatched or mesh configuration, while FIGURE 6d shows one of many curvilinear patterns which may be used in the process of this invention.

It has been found that when the cross-sections of the recesses are in the form of an arc of a circle, the diameters of the circle should range from about $\frac{1}{32}$ of an inch to about $\frac{1}{8}$ of an inch if consistent transfer of wax-bearing composition is to be obtained. In case of channelar recesses, the width should preferably range from about $\frac{1}{64}$ of an inch to about $\frac{1}{16}$ of an inch to provide consistent transfer of composition to the paperboard blank.

FIGURE 7 is a greatly enlarged perspective view of a section of paperboard blank 40 which is coated with a continuous layer 41 of moisture barrier and heat sealing composition with projections 42 formed thereon in a predetermined pattern. As can be seen, the raised portions 42 project in a regular pattern from the continuous layer 41. The left half of the section shown in FIGURE 7 is coated on the bottom side with a continuous layer 43 of moisture barrier and heat sealing composition, while the right side is uncoated.

Various modifications of the foregoing will readily occur to those persons skilled in the art. It is not intended to limit the scope of this invention by reason of the foregoing description. The scope of the invention is defined by the claims.

What is claimed is:

1. A paperboard of a caliper of from about 8 to about 30 points container blank of the type adapted to be sealed along at least one overlapping portion, a moisture barrier and heat sealing coating composition having a viscosity at 220° F. in the range of from about 40 to 400 centipoises, a fast set-up time, a high set-up temperature, good blocking resistance, and low slip-resistance applied to at least one major surface of said blank and applied on at least said sealing portion of said blank, said coating composition presenting projections in a predetermined pattern thereon.

2. A paperboard of a caliper of from about 8 to about 30 points container blank of the type adapted to be sealed along at least one overlapping portion, a continuous layer of a moisture barrier and heat sealing coating composition having a viscosity at 220° F. in the range of from about 40 to 400 centipoises, a fast set-up time, a high set-up temperature, good blocking resistance, and low slip-resistance applied to at least one major surface of said blank and applied on at least said sealing portion of said blank, said coating composition presenting projections in a predetermined pattern thereon ranging in height from about 0.4 to about 2 mils above the surface of the base coated blank.

3. A paperboard of a caliper of from about 8 to about 30 points container blank as defined in claim 2 wherein said projections are in a predetermined pattern of tubercles.

4. A paperboard of a caliper of from about 8 to about 30 points container blank as defined in claim 2 wherein said projections are in a predetermined linear pattern.

5. A paperboard of a caliper of from about 8 to about 30 points container blank of the type adapted to be sealed along at least one overlapping portion, a moisture barrier and heat sealing coating composition having (i) a viscosity at 220° F. in the range of from 40 to 400 centipoises, (ii) a fast set-up time, (iii) a high set-up temperature, (iv) good blocking resistance, and (v) low slip-resistance applied to both major surfaces of said blank and presenting projections thereon distributed in a predetermined pattern over both said major surfaces including said sealing portion.

6. A paperboard of a caliper of from about 8 to about 30 points container blank of the type adapted to be sealed along one overlapping portion, a moisture barrier and heat sealing coating composition having (i) a viscosity at 220° F. in the range of from 40 to 400 centipoises, (ii) a fast set-up time, (iii) a high set-up temperature, (iv) good blocking resistance, and (v) low slip-resistance and comprising an interpolymer of ethylene and vinyl acetate in which a major portion of said interpolymer is ethylene, microwax, a paraffin, and a terpene resin, said moisture barrier and heat sealing composition applied to at least one major surface of said blank and to at least said sealing portion of said blank and presenting projections in a predetermined pattern thereon.

7. A paperboard container blank a defined in claim 1 wherein the moisture barrier and heat sealing coating composition comprises about 55 to 85% paraffin wax containing about 60-75% by weight straight chain paraffins, about 10 to 20% microcrystalline wax melting in the range 160-180° F., about 1 to 5% polyethylene of a molecular weight of about 1500-7000, and about 5 to 20% by weight of a copolymer of the group ethylene-vinyl acetate containing about 20 to 35% by weight vinyl acetate, ethylene-methyl acrylate and ethylene-ethyl acrylate containing about 20 to 35% by weight acrylate.

8. A paperboard container blank as defined in claim 2 wherein said moisture barrier and heat sealing coating composition comprises about 55 to 85% paraffin wax containing about 60-75% by weight straight chain paraffins, about 10 to 20% microcrystalline wax melting in the range 160-180° F., about 1 to 5% polyethylene of a molecular weight of about 1500-7000, and about 5 to 20% by weight of a copolymer of the group ethylene-vinyl acetate containing about 20 to 35% by weight vinyl acetate, ethylene-methyl acrylate and ethylene-ethyl acrylate containing about 20 to 35% by weight acrylate.

References Cited by the Examiner

UNITED STATES PATENTS

| | | | |
|---|---|---|---|
| 1,997,257 | 4/1935 | Hamersley | 229—87 |
| 2,220,943 | 11/1940 | Murch | 118—258 |
| 2,328,579 | 9/1943 | Pelosi. | |
| 2,348,689 | 5/1944 | Abrams. | |
| 2,984,573 | 5/1961 | Smith. | |
| 3,025,167 | 3/1962 | Butler. | |
| 3,063,408 | 11/1962 | Gustafson et al. | 118—258 |
| 3,066,844 | 12/1962 | Moore | 229—48 |
| 3,116,008 | 12/1963 | Greene et al. | 229—48 |
| 3,140,215 | 7/1964 | Russell | 229—48 X |

GEORGE O. RALSTON, *Primary Examiner.*